Nov. 21, 1939.  L. M. SOLOMON  2,180,485
APPARATUS FOR MAKING MEASUREMENTS AND GRAPHS OF SUCCESSIVE TREE RING WIDTHS
Filed May 19, 1938  2 Sheets-Sheet 1
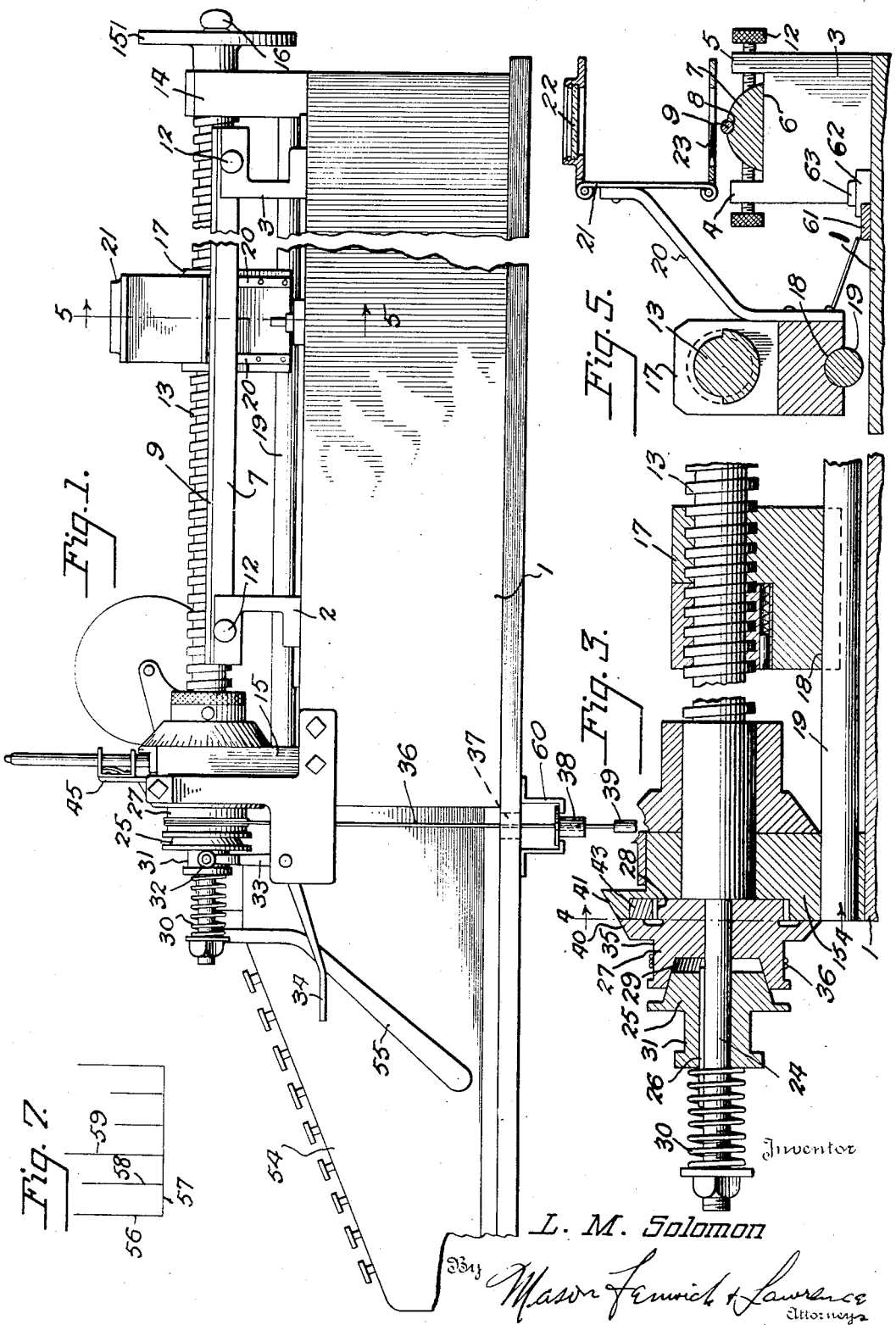
Inventor
L. M. Solomon
By Mason Fenwick & Lawrence
Attorneys

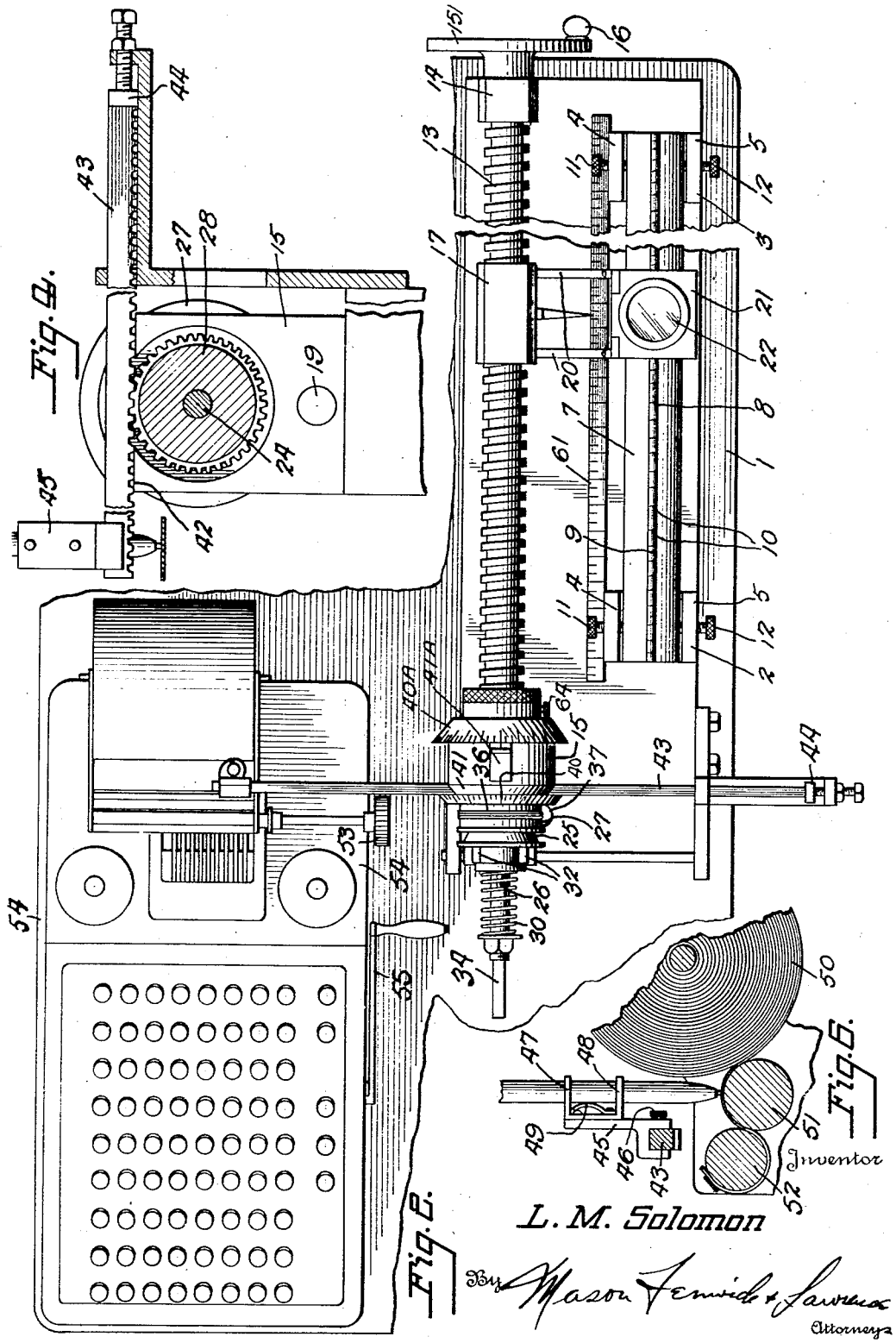

Patented Nov. 21, 1939

2,180,485

UNITED STATES PATENT OFFICE 2,180,485

APPARATUS FOR MAKING MEASUREMENTS AND GRAPHS OF SUCCESSIVE TREE RING WIDTHS

Linton M. Solomon, Macon, Ga.

Application May 19, 1938, Serial No. 208,906

8 Claims. (Cl. 33—174)

This invention relates to apparatus for measuring the width of successive three rings, and recording these widths successively and proportionately in the form of a graph which may be considered as the "finger print" of the seasons for the period of years represented by the number of measured and recorded rings of the specimen under scrutiny.

It is known that each ring represents one year's growth and that the rate of growth determines the width of the rings. For example, the ring will be wider for a moist growing season than for a season of drought, and no two successive rings will be of exactly the same width for no two successive seasons are identical as to climatic conditions. It is known also that in the same locality, for trees growing contemporaneously, the graphs covering the same period of years will be proportionately identical.

Thus, starting with a tree the year of growth of whose youngest ring is known, making a graph of a group of successive ring widths of this specimen which include the youngest ring, overlapping it with the identical portion of another graph which includes also a still earlier period of years, and by continuing this process, scientific knowledge regarding climatic conditions of each individual year for several hundred successive years, may be definitely extended. This is true particularly in parts of the country where wood from the buried camp fire debris of successive populations has been graphed.

Heretofore, such graphs have been made laboriously and by hand. The present invention has for its object to make the graphs automatically with precision and accuracy and, in conjunction with an adding machine, permits proportional numerical evaluations to be assigned to the elements of the graphs.

Other objects of the invention will appear as the following description of a preferred and practical embodiment thereof proceeds.

In the drawings which accompany and form a part of the following specification and throughout the several figures of which the same characters of reference have been employed to designate identical parts:

Figure 1 is a side elevation of the apparatus embodying the principles of the present invention;

Figure 2 is a plan view;

Figure 3 is a vertical section through the clutch and measuring screw;

Figure 4 is a section taken along the line 4—4 of Figure 3;

Figure 5 is a section taken along the line 5—5 of Figure 1;

Figure 6 is a fragmentary view in section illustrating the mounting of the pencil or stylus; and Figure 7 is the representation of a specimen graph.

Referring now in detail to the several figures the numeral 1 represents a base upon which a pair of spaced supports 2 and 3 are mounted. The upper ends of said supports are formed with the flanges 4 and 5 defining between them recesses 6 forming a seat for the holder 7 which as shown is a half round molding having a longitudinal groove 8 in its upper face, said groove forming a seat for the tree boring 9. Said tree boring is a plug of wood taken radially from the tree under observation and it exhibits the rings of growth which are indicated in Figure 4 by the reference character 10. Set screws 11 and 12 are threaded through the flanges 4 and 5 and bear against the holder 7 by means of which it can be adjusted vertically as well as to or from either side of the supports 2 and 3.

A measuring screw 13 is mounted in suitable bearings 14 and 15 on an axis parallel to the vertical median plane passing through the supports 2 and 3. The outer end of said screw has a crank or handle 151 by which it may be turned.

A carriage 17 has the form of a nut threaded upon the screw 13. The lower end of said carriage is formed with a groove 18 which slides upon a rod 19 by means of which rod the carriage 17 is prevented from rotating and therefore reciprocates along the screw 13 when the latter is rotated. The carriage has rigid arms 20 which extend forwardly in the direction of the holder 7 and carry a low power microscope 21, the optical axis of which is in the vertical median plane of the supports 2 and 3. The upper end of the microscope carries the lens 22 while the lower end has an index needle 23 terminating in the optical axis of the microscope and at the focus of the lens 22. The needle 23 is so close to the tree boring 9 that the rings on the tree boring are sufficiently in focus to be distinctly magnified. The adjustments effected by the set screws 11 and 12 are such as to bring the tree boring into parallelism with the path of travel with the needle 23 and also into the vertical plane of the optical axis of the microscope.

The measuring screw has an extension 24 beyond the bearing 15 which extension carries the male clutch member 25, splinably mounted by means of the key 26. A drum 27 revolubly surrounds the extension 24 of the screw 13 and abuts against the bearing 15. Said drum carries a gear 28 housed in a recess in the adjacent face of said bearing. The drum 27 has a recess 29 into which the clutch member 25 wedgingly fits under the urge of the spring 30. The clutch member 25 has a surrounding channel 31 in which the ends 32 of a yoke fit, said yoke being part of a bell crank 33 having an operating arm or lever 34 for releasing the clutch against the pressure of the spring 30. The drum has a groove 35 about which a cord or cable 36 winds, one end of said cord or cable being fixed to said drum. The other end of said cord passes downward through a hole 37 in the base 1 and is shown as passing through a collared weight 38 supported by a bracket 60 and which acts in conjunction with a weight 39 at the end of the cord.

When the clutch is in engagement with the drum and the screw 13 is rotated by its operating handle 16 in a direction to move the carriage 17 to the rightward, the drum rotates with the clutch in a direction to wind up the cord 36 on the drum, the weight 39 picking up the weight 38, lifting it from the bracket 60. When the clutch is released the cord rotates the drum in the opposite direction impelled by both weights. The drum has a bevelled face 40 showing a circumferential scale divided into 100 equal parts. The bearing 15 is formed at the top with a bevelled portion 41 which coincides with the bevelled face 40. There is a vernier scale on the portion 41 dividing one of the scale intervals of the face 40 into 10 equal parts.

It will be observed particularly from Figure 4 that the upper part of the bearing has a transverse guideway 42 extending therethrough in which a rack bar 43 slides, said rack being in mesh with the gear 28. When the drum is rotated in the direction described, by the clutch 25, the rack bar 43 moves leftward. When the drum is declutched and is rotating in the opposite direction under the urge of the weighted cord 36, the rack bar 43 moves to the right. There is an adjustable stop 44 at the right, against which the rack bar abuts determining the limit of its rightward movement.

The weight 38 comes to rest in the bracket 60 before the drum has returned to its repose position determined by the rack bar hitting the stop 44, further rotation of the drum to its repose position being under the urge of the single weight 39, thus easing the blow of contact between the rack bar with said stop.

The opposite end of the rack bar carries a pencil holder 45. This is shown as being adjustable along the rack bar by means of the set screw 46. It carries a frame having upper and lower flanges 47 and 48 with holes for receiving the pencil and between said flanges there is a spring 49 pressing against the pencil and holding it frictionally in position.

There is a roll of paper 50 from which paper is drawn over a platen 51 by means of a winding roll 52 having a knob 53. The pencil bears down upon the paper where the paper engages the platen, the latter serving as a support beneath the paper against which the pencil presses.

In the present embodiment of the invention, the roll of paper 50, the platen 51 and the winding roll 52 are appurtenances of a conventional adding machine 54 having a handle 55 which operates mechanism that prints a total upon the paper and advances the paper step by step.

In operation, the holder 7 with the tree boring 9 in place is properly adjusted by means of the set screws 11 and 12 both as to the focal plane and the path of traverse of the end of the index needle 23 as the carriage travels along the screw. The microscope is then set toward the left end of the screw 13 with the needle precisely located at the beginning of the first ring. The clutch member 25 is in engagement with the drum 25. The handle 16 is turned by the operator whose eye is applied to the microscope. When the needle 23 arrives at the line of demarcation between the first and second rings, the operator stops turning the handle 16. During the time the screw 13 was being rotated the rack bar 43 travelled leftward as viewed in Figure 4 causing the pencil to draw a straight line 56, Figure 7, on the paper above the platen 51, see Figure 2. At this time the operator reads the value of the angle of rotation of the drum 27 on the scales on the face 40 of the drum and the vernier on the bevelled portion 41 and sets this value on the adding machine. He next declutches the clutch member 25 by pressing on the lever 34 whereupon the drum 27 rotates in the opposite direction, pulled by the weighted cord 36 causing the rack bar to draw the pencil back over the line 56 which it has already made, until the rack bar abuts against the stop 44. The length of this line is proportional to the width of the first ring. Its ratio of enlargement is greater than one to one in the interest of greater accuracy in the future comparison of graphs, the ratio of enlargement being determined by the ratio between the diameters of the gear 28 and the pitch of the screw 13. It will be understood that while the drum 27 is unwinding restoring the rack bar to zero position, the screw does not rotate and the carriage therefore stands absolutely motionless with the end of the needle 23 upon the boundary between the first and second rings. The operator then pulls the handle 55 of the adding machine which prints the scale value of the angular displacement of the drum on the paper and at the same time moves the paper causing the pencil to make a mark 57 at the left end of the line 56 and perpendicular thereto. This line represents the spacing between the lines 56, 58, 59, etc., representing the successive proportionate tree ring widths, and is also a datum at the foot of all of the ring lines.

The clutch member 25 is then re-engaged with the drum 27 and the handle 16 again turned moving the index needle 23 of the microscope across the width of the second ring, the several actions of the apparatus and the several manipulations by the operator being repetitions of those described in connection with the measurement and recording of the width of the first ring.

Figure 4 shows that there is a second dial 40A which rotates with the screw and having a circumferential scale which is identical with the scale on the dial 40. The difference in movement of these two dials is that the dial 40 comes back to zero every time the clutch is declutched while the dial 40A rotates in the same direction cumulatively during the measurement of an entire series of rings, being set back to zero only when the carriage is reset on the screw to a position with the index pointer at the beginning of the first ring of the series to be measured. A set screw 64 permits the dial 40A to be released from the screw and secured relative thereto in the zero position.

The dial 40A operates in conjunction with a scale on a longitudinal scale plate 61 which carries a scale, intervals of which are so related to the pitch of the screw that the width of one interval equals the movement of the carriage for one revolution of the screw. Thus the scale on the dial 40A is read in conjunction with the scale on the scale plate 61, the latter giving the cumulative number of revolutions of the screw while the dial gives the fraction of a revolution.

The figures set up on the adding machine representing the width of each ring are taken from the reading of the scale on the dial 40. The total of these individual ring width values should agree with the total read from the scale plate 61 in conjunction with the dial 40A. A vernier 41A is positioned in conjunction with the scale on the dial 40A. The scale plate 61 is held by a clamp 62 secured by a set screw 63 and which permits longitudinal adjustment of said scale plate.

While I have in the above description disclosed what I believe to be a preferred and practical embodiment of the invention, it will be understood to those skilled in the art that the specific details of construction and arrangement of parts are by way of example and not to be construed as limiting the scope of the invention as defined in the appended claims.

What I claim as:

1. Apparatus for measuring the width of successive tree rings from a tree boring and automatically translating the measurements into a proportional graph, comprising a base, a screw mounted on the base, a carriage mounted and threaded upon said screw to travel axially thereupon when the screw is turned, a holder for supporting a tree boring parallel to the axis of said screw, an index point moving with said carriage in proximity to said tree boring, means for rotating said screw, means actuated by said screw mounted on the base for moving a pencil or other marking stylus rectilinearly upon a graph sheet, clutch means for connecting said pencil-moving means to said screw for moving said pencil in one direction from a repose position when said screw is turned, means connected to said pencil moving means operable upon release of said clutch for moving said pencil in the opposite direction independent of said screw, and means on said base for moving said graph sheet step by step in a direction perpendicular to the direction of movement of said pencil-moving means and means actuable at will for operating said graph sheet moving means.

2. Apparatus for measuring the width of successive tree rings from a tree boring and automatically translating the measurements into a proportional graph, comprising a base, a screw mounted on the base, a carriage mounted, and threaded upon said screw to travel axially thereupon when the screw is turned, a holder for supporting a tree boring parallel to the axis of said screw, an index point moving with said carriage in proximity to said tree boring, a microscope mounted on said carriage with its focal point substantially at said index point, means for rotating said screw, a rack bar for moving a pencil or other marking stylus rectilinearly upon a graph sheet, a member normally independent of said screw carrying a gear meshing with said rack bar, a clutch for connecting said gear-carrying member to said screw whereby said rack bar and pencil are moved from a repose position in one direction when said screw is turned, and means attached to said gear-carrying member acquiring energy through the turning of said screw while said clutch is in engagement with said gear-carrying member for moving said rack bar back to its position of repose upon release of said clutch.

3. Apparatus for measuring the width of successive tree rings from a tree boring and automatically translating the measurements into a proportional graph, comprising a base, a screw mounted on the base, a carriage mounted, and threaded upon said screw to travel axially thereupon when the screw is turned, a holder for supporting a tree boring parallel to the axis of said screw, an index point moving with said carriage in proximity to said tree boring, means for rotating said screw, a rack bar slidably mounted on the base for moving a pencil or other marking stylus rectilinearly upon a graph sheet, a member rotatably mounted on said screw carrying a gear meshing with said rack bar, a clutch for connecting said gear-carrying member to said screw whereby said rack bar and pencil are moved from a repose position in one direction when said screw is turned, and means attached to said gear-carrying member acquiring energy through the turning of said screw while said clutch is in engagement with said gear-carrying member for moving said rack bar back to its position of repose upon release of said clutch.

4. Apparatus for measuring the width of successive tree rings from a tree boring and automatically translating the measurements into a proportional graph, comprising a base, a screw mounted on the base, a carriage mounted, and threaded upon said screw to travel axially thereupon when the screw is turned, a holder for supporting a tree boring parallel to the axis of said screw, an index point moving with said carriage in proximity to said tree boring, means for rotating said screw, a rack bar slidably mounted on the base for moving a pencil or other marking stylus rectilinearly upon a graph sheet, a drum mounted axially of said screw and normally independent thereof, a gear carried by said drum meshing with said rack bar, a clutch for connecting said screw and drum whereby said rack bar and pencil are moved from a repose position in one direction when said screw is turned, and means attached to said drum acquiring energy through the turning of said screw while said clutch is in engagement with said drum for moving said rack bar and pencil back to the original position of repose upon release of said clutch.

5. Apparatus for measuring the width of successive tree rings from a tree boring and automatically translating the measurements into a proportional graph, comprising a base, a screw mounted on the base, a carriage mounted, and threaded upon said screw to travel axially thereupon when the screw is turned, a holder on the base for supporting a tree boring, an index point movable with said carriage in proximity to said tree boring, a microscope mounted on said carriage with its focal point substantially at said index point, means for adjusting said holder to bring it into the focal plane of said microscope and parallel to the axis of said screw, means for rotating said screw, the latter having an axial extension at one end, a drum freely rotatable upon said extension, a gear carried by said drum, a clutch on said extension rotatable with said screw and engageable with said drum, a rack bar meshing with said gear, a pencil carried by said rack bar resting upon a graph sheet, said rack bar and pencil moving in one direction from a position of repose when said clutch is engaged with said drum and said screw is turned, means attached to said drum acquiring energy through the turning of said drum by said screw for moving said rack bar back to its position of repose upon release of said clutch, and means mounted on the base for advancing said graph sheet step by step in a direction perpendicular to the direction of movement of said rack bar.

6. In combination a base, a computing device mounted on the base including means for feeding a roll of paper by a step by step motion and means for imprinting on the paper the computations of the device, means on the base for holding a specimen to be measured, a pointer, means on the base for moving said pointer over the specimen, means on the base for suspending a pencil over the paper being fed to the computing device to mark the same and means associating the pointer moving means and pencil supporting means to move the pencil concurrently and proportionally with the pointer.

7. The structure of claim 6 in which the means associating the pointer moving means and pencil supporting means includes a releasable clutch device whereby either of said means may be operated independently.

8. The structure of claim 6 in which the means associating the pointer moving means and pencil supporting means includes means tensioning the pencil holding means to position the pencil on a common datum line and releasable clutch means whereby said tensioning means may operate independently of the pointer moving means.

LINTON M. SOLOMON.